(12) United States Patent
Brown

(10) Patent No.: US 6,236,511 B1
(45) Date of Patent: May 22, 2001

(54) BEAM COMBINING OPTICAL ELEMENT

(75) Inventor: Robert D. Brown, Portland, OR (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 09/528,734

(22) Filed: Mar. 20, 2000

(51) Int. Cl.[7] ............................ G02B 27/14; G02B 3/08
(52) U.S. Cl. ............................................. 359/634; 359/742
(58) Field of Search .................................. 359/630, 634, 359/639, 457, 742, 743; 345/7, 8

(56) References Cited

U.S. PATENT DOCUMENTS 3,762,809 * 10/1973 Kato et al. ............................ 353/66
5,625,493 * 4/1997 Matsumura et al. .................. 359/630

* cited by examiner

Primary Examiner—Ricky Mack
(74) Attorney, Agent, or Firm—Nathan O. Jensen; Kyle Eppele; J. P. O'Shaughnessy

(57) ABSTRACT

An optical combiner with a Fresnel lens having a Fresnel surface coated with a thin film spectrally selective reflective coating configured to reflect light within a first wavelength range, and transmit light within a second wavelength range is provided. The optical combiner also includes a covering which covers the Fresnel surface and the reflective coating to provide a generally planar surface which is substantially parallel to a similarly planar exterior surface of the Fresnel lens. The covering may take the form of an optical adhesive (or of a second Fresnel lens) with an index of refraction which substantially matches the index of refraction of the Fresnel lens.

20 Claims, 3 Drawing Sheets

BEAM COMBINING OPTICAL ELEMENT

TECHNICAL FIELD

The present invention relates generally to vehicle head-up display (HUD) systems, and more particularly, to a lightweight optical combiner which employs a Fresnel lens design.

BACKGROUND OF THE INVENTION

HUD systems typically are used in aircraft to provide pilots with information superimposed onto their forward field of view through the aircraft windshield. The information displayed may be data or symbolic images indicative of flight conditions such as the operating condition of the aircraft, environmental information or guidance information for use in bringing the aircraft to its destination. These images are presented in overlying fashion on the pilot's field of view so as not to interfere with the pilot's view of the background scene.

Although HUD systems may be useful in a variety of applications, known combiners are either undesirably thick and heavy for most applications, or are thin and undesirably highly curved. The thick combiners contain a pair of cooperative lens elements, at least one of which includes an embedded spherical surface coated with a spectrally reflecting thin film. The external surfaces of these thick combiners are flat so as to provide an undistorted view of the background scene. Thin combiners, on the other hand, typically employ a pair of spherical external surfaces, one of which carries the spectrally reflecting thin film. Thin combiners thus typically do not provide the necessary undistorted view of the background scene, especially when the combiner is thick enough to be adequately durable.

What is needed is an optical combiner which is thin and flat, but which contains sufficient optical power to present a collimated image on a relatively undistorted background scene.

SUMMARY OF THE INVENTION

Briefly, the invention concerns an optical combiner with a Fresnel lens having a Fresnel surface coated with a thin film spectrally selective reflective coating configured to reflect light within a first wavelength range, and transmit light within a second wavelength range. The optical combiner also includes a covering which covers the Fresnel surface and the reflective coating to provide a generally planar surface which is substantially parallel to a similarly planar exterior surface of the Fresnel lens. The covering may take the form of an optical adhesive (or of a second Fresnel lens) with an index of refraction which substantially matches the index of refraction of the Fresnel lens.

An optical system thus is provided for producing images and presenting them for observation in combination with an observer's visual exterior view of an outside world scene. The optical display system includes an image source providing an image carried by wavelengths of light propagating along an optical path toward an optical combiner positioned so that an observer can see the visual exterior view through the optical combiner and so that at least one of the wavelengths reflect off of the optical combiner to provide an image for observation by the observer. As indicated above, the optical combiner includes a Fresnel lens having a planar surface and a Fresnel surface opposite the planar surface, a reflective coating which coats the Fresnel surface of the Fresnel lens, and a covering which covers the reflective coating to provide a planar surface which is substantially parallel to the planar surface of the Fresnel lens. The reflective coating is configured to reflect light within a first wavelength range and to transmit light within a second wavelength range, and the covering is selected to have an index of refraction which substantially matches an index of refraction of the Fresnel lens.

DETAILED DESCRIPTION OF THE PREFERRED EMBODIMENT AND BEST MODE OF CARRYING OUT THE INVENTION

Figure 1:
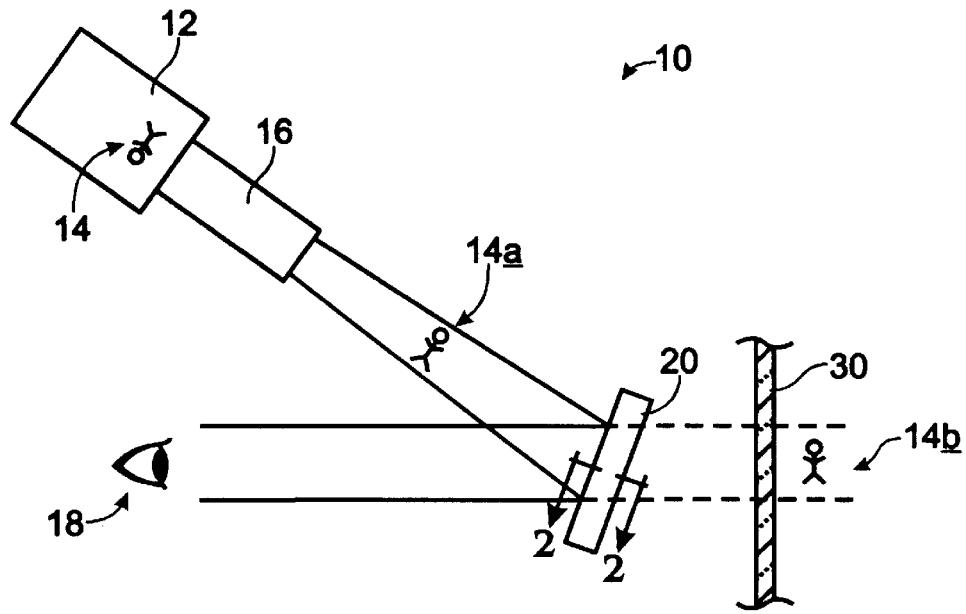
FIG. 1 is a schematic diagram of an optical display system of an aircraft headup display (HUD).

FIG. 1 shows a head-up display (HUD) system 10 installed in a vehicle for use by a vehicle occupant to view information superimposed onto the occupant's field of view via an optical combiner 20. As indicated, the information (typically an image 14, 14a, 14b) is presented in combination with the occupant's view of an outside world scene through the vehicle windshield 30 without compromising the occupant's view of such world scene.

System 10 thus includes an image source 12 which produces an image 14 carried by light rays which propagate through a monochromic relay lens 16 to create an intermediate image 14a. Image 14a is carried by light rays and reflected by optical combiner 20 to create a collimated final virtual image 14b that is viewed from the observer's eye reference point 18. Optical combiner 20 thus superimposes the final virtual image 14b at or near optical infinity on the outside world scene that the observer sees through windshield 30.

Image source 12 is typically a cathode-ray tube that emits an image that includes a green component carried by multiple wavelengths of light within the range of approximately 540–560 nanometers (nm). The image source also may emit a red component carried by wavelengths of light within the range of approximately 610–640 nanometers (nm) and/or a blue component carried by wavelengths of light within a range of approximately 470–500 nanometers (nm). Those skilled in the art will appreciate that other colors of light similarly may be used. Where the image source emits color components of a multi-colored image as described herein, the color components typically are emitted in a conventional field sequential manner so that the components are laterally field corrected as they propagate generally along a light path toward relay lens 16.

Relay lens 16 transfers the image produced by image source 12 to combiner 20 along the referenced light path. The relay lens preferably is a conventional monochromatic lens array configured to transfer a single color of light having a range a wavelengths centered about 544 nm (i.e., green light) that is typically produced by a cathode-ray tube constructed with a P53 phosphor having spectral properties similar to those shown in FIG. 6.

Lens 16 typically includes between 5 and 12 optical lens elements which cooperate to form a focussed intermediate image 14a. Each lens element is specifically configured with curved surfaces and thickness that cooperate to bend the light as it propagates through the relay lens. The radii of the curved surfaces and thicknesses of the lens elements can be determined by a person sufficiently skilled to use a commercially available ray trace program such as Code V or Oslo Six software analysis and design programs.

Intermediate image 14a is reflected and refracted by combiner 20 to create final virtual image 14b that has a focal point at or near optical infinity for each wavelength of light that the observer views from eye reference point 18. As indicated, the reflected light is collimated by the optical combiner to present a focussed final virtual image to an observer for observation in combination with the observer's view of an outside world scene. Optical combiner 20 is positioned so that the observer can see a visual exterior view through the optical combiner.

Figure 2:
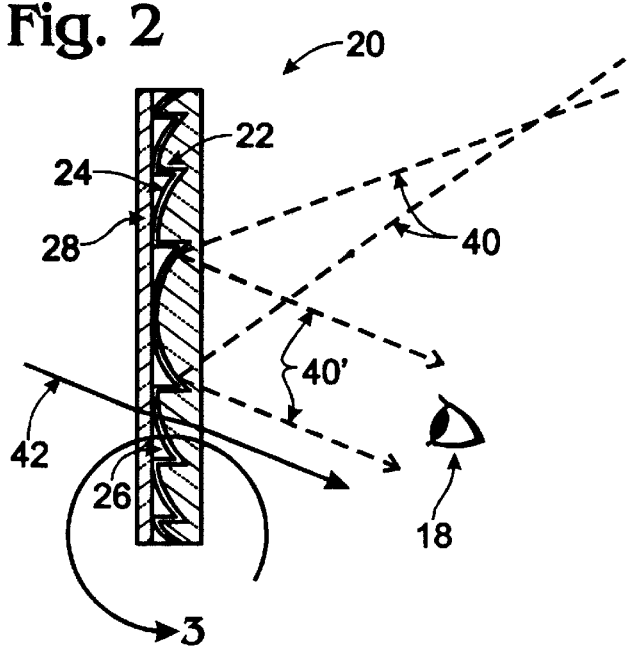
FIG. 2 is a sectional view taken along lines 2—2 of FIG. 1 showing a first embodiment of an optical combiner constructed in accordance with the present invention.
Figure 3:
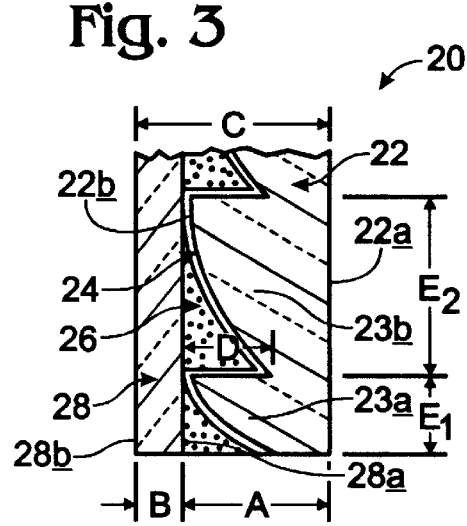
FIG. 3 is a fragmentary sectional view taken along lines 3—3 of FIG. 2.

Referring now to FIGS. 2 and 3, a somewhat schematic representation of optical combiner 20 is provided, such optical combiner being constructed in accordance with the present invention. As indicated, optical combiner 20 includes a Fresnel lens 22 having a planar surface 22a and a Fresnel surface 22b opposite such planar surface. The Fresnel surface, it will be appreciated, is divided into a plurality of concentric circular zones, each zone typically being a collapsed section of a more conventional curved lens.

In accordance with the present invention, the Fresnel surface of lens 22 is coated with a thin film reflective coating 24 which reflects light within a first wavelength range (typically green light within a wavelength range of approximately 540–560 nm) and transmits light within a second wavelength range (typically substantially all other light). This wavelength-selective reflective coating (the thickness of which is exaggerated in the drawings for illustrative purposes) typically is a multilayer dielectric thin film coated on surface 22a and having a reflectivity of >50% over a 540–560 nm range.

Optical combiner 20 also includes a covering 26 which covers the reflective coating, and thus covers the Fresnel surface of lens 22. In the present embodiment, the covering takes the form of an optical adhesive selected to have an index of refraction which matches the index of refraction of the Fresnel lens. This effectively creates a second Fresnel lens of equal and opposite power. The second Fresnel lens (i.e. the optical adhesive), in turn, is in cooperative relation with the first Fresnel lens 22. Such configuration results in a lens which is zero power in transmission, effectively eliminating distortion in the background scene.

A transparent plate 28 may be employed to overlie covering 26, particularly where the covering is an optical adhesive or the like. The plate typically includes opposite planar surfaces 28a, 28b, surface 28a being configured to define a planar surface of the optical adhesive which is parallel to planar surface 22a of Fresnel lens 22. The transparent plate is secured to the Fresnel lens via optical adhesive 26.

With reference to FIG. 3, it will be noted that the Fresnel lens typically has a thickness A of less than 0.25-inch, and preferably of less than 0.10-inch. Transparent plate 28 also has a thickness B of less than 0.25-inch and preferably of less than 0.10-inch, providing a combiner with an overall thickness C which is less than 0.50-inch thick, and preferably less than 0.2-inch thick to provide a thin, planar optical combiner for use in a HUD system as described above.

Although the depicted Fresnel lens is shown with only four zones, it will be understood that the lens more typically will include 30 to 70 zones within an 8-inch diameter lens. Furthermore, as will be appreciated by those skilled in the art, the Fresnel lens may be constructed with zones of varying riser height D or varying zone width (E1, E2) and may be constructed with zones of various surface characteristics (e.g. prismatic, spherical, aspherical, etc.). Aspherically powered Fresnel lenses, it will be appreciated, can more efficiently correct for the optical aberations of the relay lens, allowing simpler relay lens optics.

For example, it is to be noted that Fresnel lenses typically are made with constant zone widths, but with varying riser height so as to produce the desired optical effect. In contrast, the present invention typically employs a Fresnel lens with zones of varying width, the riser height being held constant so as to minimize optical aberrations, losses due to riser height, and the number of required zones. By varying zone width, it also is possible to keep the riser height small, thereby ensuring that parallel rays incident on each side of a riser are of nearly equal optical path. Smaller riser height also reduces the visibility of the zones, the desired result being an optical surface that appears smooth and zone free.

On the other hand, the smaller the riser height, the greater the number of zones. Accordingly, it is desirable to keep the riser height above a predetermined minimum, typically 0.005-inch. In the present embodiment, the riser height is optimally between approximately 0.005-inch and approximately 0.020-inch.

The depicted Fresnel lens may be made using a single-point diamond turning on a CNC lathe. This process produces an optical surface with acceptably low scatter and haze, without requiring expensive molding tools. Nevertheless, molding may be a preferable manufacturing technique when high quantities are desired.

Figure 6:
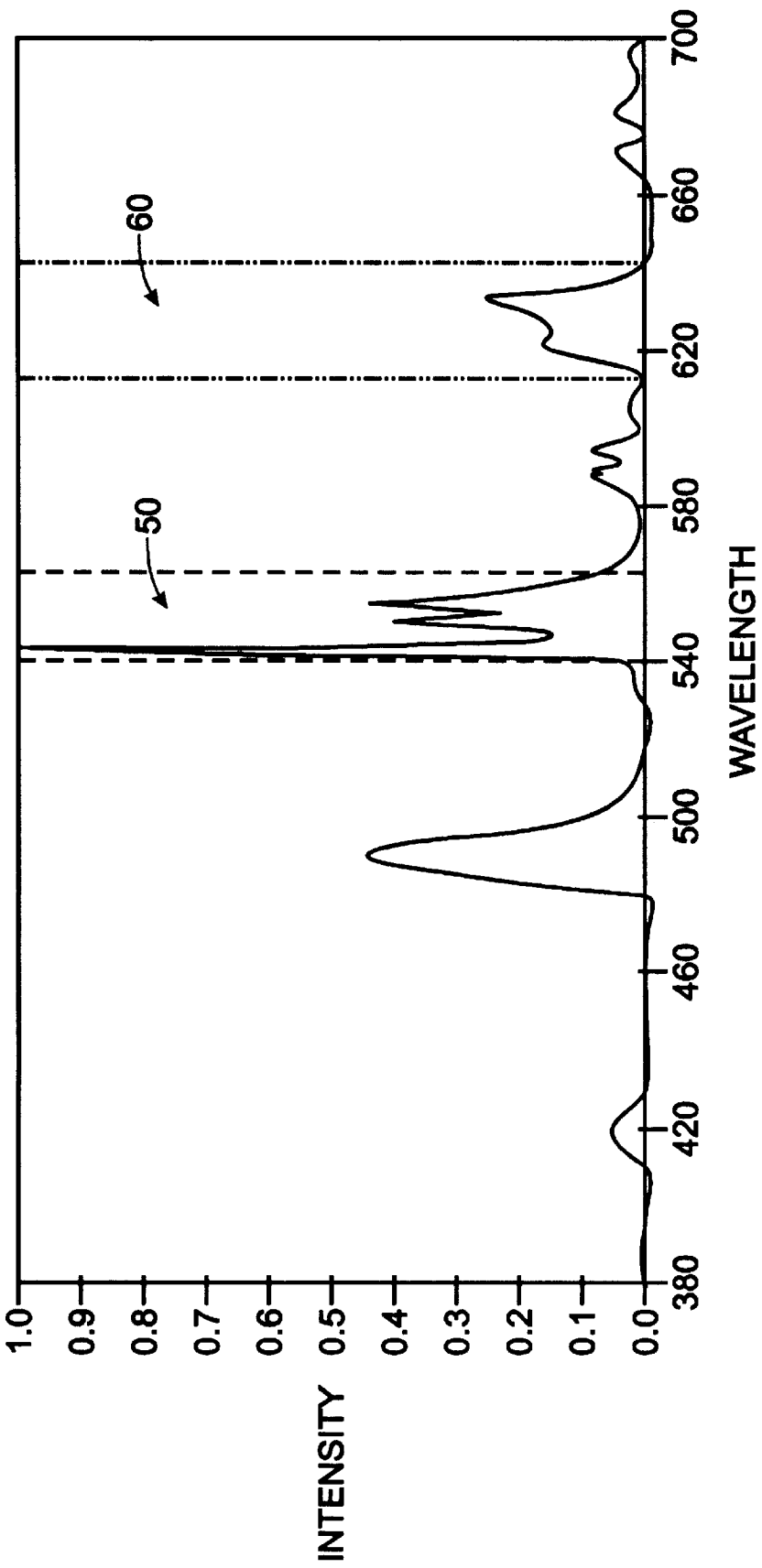
FIG. 6 is a graph showing the light emission spectral characteristics of the phosphor used in the cathode ray tube light source of FIG. 1.

As shown in FIG. 2, lights rays 40 propagate along a light path from the image source to the combiner. Typically, light rays 40 are green light within a predetermined wavelength range 50 (FIG. 6). Coating 24 reflects light 40' within a first wavelength range (typically green light) and transmits all other light rays. It also will be noted that reflected light 40' is collimated by operation of lens 22. However, transmitted light is transmitted through the optical combiner under zero optical power due to covering 26.

As indicated previously, the combiner is configured to present the reflected images for observation in combination with an observer's visual exterior view of an outside world scene. Therefore, it will be appreciated that the combiner preferably will be configured to transmit light from the outside world scene with minimum refraction/distortion. Accordingly, both Fresnel lens 22 and covering 26 are constructed of optical materials (e.g. plastic) with matching indices of refraction. A light ray 42 which is incident upon optical combiner 20 thus will experience minimal refraction and distortion as it passes through the optical combiner.

Figure 4:
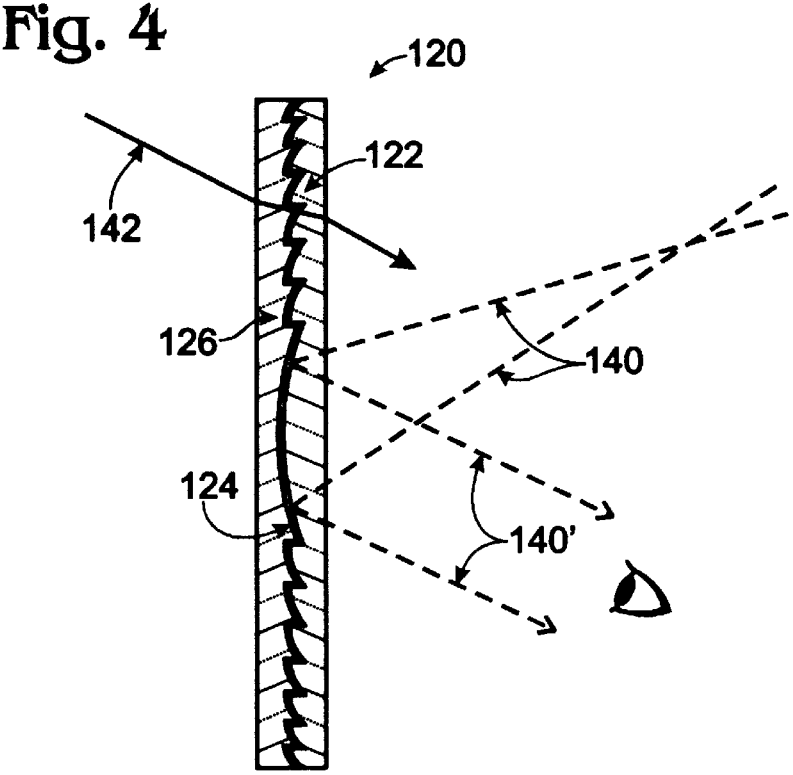
FIG. 4 is a sectional view of a second embodiment optical combiner.

FIG. 4 shows an alternative embodiment optical combiner 120, such combiner employing first and second Fresnel lenses 122, 124. As indicated, a first Fresnel lens 122 is employed to provide the optical power required to collimate propagated light 140. Fresnel lens 122 has a Fresnel surface coated with a wavelength-selective thin film reflective coating 124, which, in turn, is covered by a second Fresnel lens 126. The second Fresnel lens has a Fresnel surface which matches the Fresnel surface of the first Fresnel lens. The second Fresnel lens thus will be understood to be of equal and opposite optical power so as to maintain a zero power optical element in transmission. The second Fresnel lens is bonded to the reflective coating (and thus to the first Fresnel lens) via an optical adhesive (not shown). The first Fresnel lens and second Fresnel lens each has a planar surface opposite their corresponding Fresnel surface to provide an optical combiner with opposing planar exterior surfaces.

In accordance with the invention, light rays 140 propagate along a light path onto the optical combiner 120. Coating 124 reflects light within a predetermined wavelength range (again, typically green light) and transmits all other light. In the embodiment depicted in FIG. 4, coating 124 is selected to reflect light in accordance with a predetermined characteristic which reflects green light, but transmits substantially all other light. Therefore, light 140 (which is entirely green light) is reflected as indicated at 140'. Reflected light is collimated. Transmitted light is transmitted through the optical combiner under zero optical power due to second Fresnel lens 126. Both the first Fresnel lens 122 and the second Fresnel lens 128 are constructed of optical materials with matching indices of refraction. A light ray 142 (which is outside of the first wavelength range) from the outside world which is incident upon optical combiner 120 thus will experience minimal refraction and distortion as it passes through the optical combiner.

Figure 5:
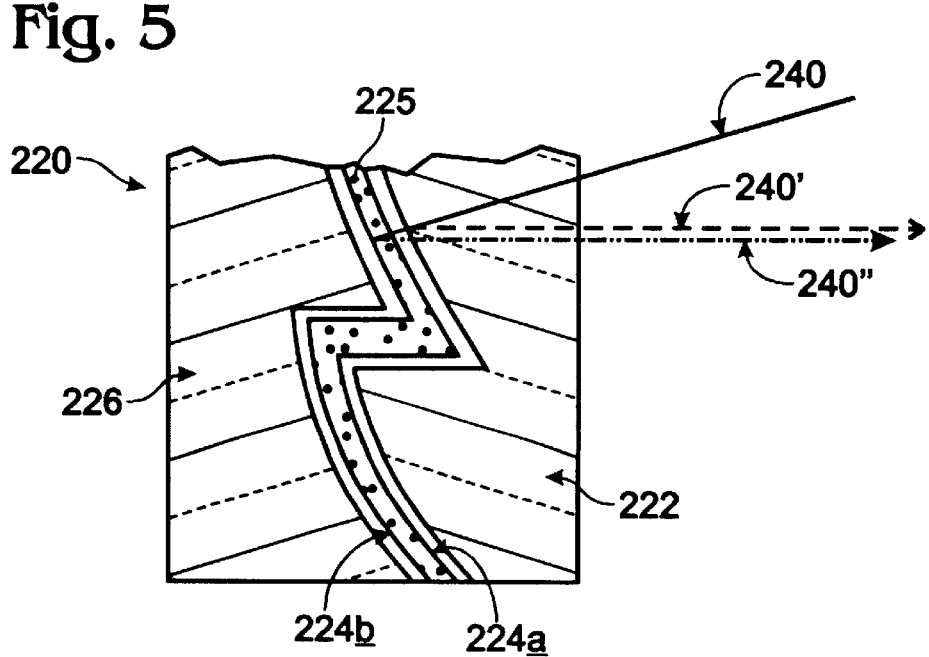
FIG. 5 is a fragmentary sectional view of a third embodiment optical combiner.

FIG. 5 depicts a second alternative embodiment of the invention wherein a combiner 220 includes a first Fresnel lens 222 with a first Fresnel surface coated with a first wavelength-selective thin film coating 224a and a second, matching Fresnel lens 228 with a second Fresnel surface coated with a second wavelength-selective thin film reflective coating 224b. The two Fresnel lenses are bonded together via an optical adhesive 225.

Based on the foregoing, it will be appreciated that the second reflective coating may be selected to reflect a different wavelength of light so as to provide a color-corrected HUD optical system. Accordingly, light 240 is propagated toward the optical combiner with green light reflected by the first reflective coating as indicated at 240' and another color (e.g., red light within a wavelength range 60 (FIG. 6)) reflected by the second reflective coating as indicated at 240". Other light is transmitted. Such a multi-color combiner (absent the Fresnel lenses) is described in U.S. Pat. No. 5,710,668 to Gohman et al., which issued on Jan. 20, 1998. The subject matter of that patent is incorporated herein by this reference.

Accordingly, while the present invention has been shown and described with reference to the foregoing preferred device and method for its use, it will be apparent to those skilled in the art that other changes in form and detail may be made therein without departing from the spirit and scope of the invention as defined in the appended claims.

I claim:

1. An optical combiner comprising:

a first lens having an index of refraction, the first lens including a planar surface and a Fresnel surface opposite the planar surface;

a first reflective coating which coats the Fresnel surface of the first lens, the first reflective coating being configured to reflect light within a first wavelength range and to transmit light within a second wavelength range; and a covering having an index of refraction which substantially matches the index of refraction of the first lens, the covering being configured to cover the first reflective coating to provide a planar surface which is substantially parallel to the planar surface of the first lens.

2. The optical combiner of claim 1, wherein the Fresnel surface includes a plurality of concentric zones.

3. The optical combiner of claim 2, wherein the concentric zones are circular.

4. The optical combiner of claim 2, wherein the concentric zones have aspherical cross-sections.

5. The optical combiner of claim 2, wherein the concentric zones have a constant riser height.

6. The optical combiner of claim 5, wherein the concentric zones have varying zone widths.

7. The optical combiner of claim 5, wherein the riser height is within a range of between approximately 0.005-inches and approximately 0.020-inches.

8. The optical combiner of claim 1, wherein the first wavelength range includes wavelengths between approximately 540-nanometers and approximately 560-nanometers.

9. The optical combiner of claim 1, wherein the covering is an optical epoxy.

10. The optical combiner of claim 9 which further comprises an optically-transmissive plate having opposing planar surfaces, the optically transmissive plate being configured to cover the optical epoxy.

11. The optical combiner of claim 1, wherein the covering is a second lens, the second lens including a Fresnel surface which matches the Fresnel surface of the first lens.

12. The optical combiner of claim 11, wherein the Fresnel surface of the first lens has a first optical power, and the Fresnel surface of the second lens has an equal and opposite second optical power.

13. The optical combiner of claim 11, wherein the first lens is secured to the reflective coating using an optical adhesive.

14. The optical combiner of claim 11 which further comprises a second reflective coating which coats the Fresnel surface of the second lens, the second reflective coating being configured to reflect light within a third wavelength range outside the first wavelength range.

15. The optical combiner of claim 14, wherein the third wavelength range is between approximately 590-nanometers and approximately 640-nanometers.

16. The optical combiner of claim 1, wherein the combiner is less than approximately 0.2-inches thick.

17. An optical combiner comprising:

a first lens having an index of refraction, the first lens including a planar surface and a Fresnel surface opposite the planar surface, the Fresnel surface including a plurality of concentric circular zones, each zone having a predetermined riser height;

a thin film reflective coating which coats the Fresnel surface of the first lens, the reflective coating being configured to reflect light within a first wavelength range and to transmit light within a second wavelength range; and a second lens having an index of refraction which substantially matches the index of refraction of the first lens, the second lens including a planar surface and a Fresnel surface which matches the Fresnel surface of the first lens, the second lens being configured to cover the reflective coating in mating relation with the first lens to provide an optical combiner with substantially parallel opposing planar surfaces.

18. The optical combiner of claim 17 which further comprises a second thin film reflective coating which coats the Fresnel surface of the second lens, the second thin film reflective coating being configured to reflect light within a third wavelength range outside the first wavelength range.

19. An optical display system for producing images and presenting them for observation in combination with an observer's visual exterior view of an outside world scene, the optical display system comprising:

an image source providing an image carried by wavelengths of light propagating along an optical path; and an optical combiner positioned so that an observer can see the visual exterior view through the optical combiner and so that at least one of the wavelengths reflect off of the optical combiner to provide an image for observation by the observer, the optical combiner including a lens having a planar surface and a Fresnel surface opposite the planar surface, a reflective coating which coats the Fresnel surface of the first lens, and a covering which covers the reflective coating to provide a planar surface which is substantially parallel to the planar surface of the lens, wherein the reflective coating is configured to reflect light within a first wavelength range and to transmit light within a second wavelength range, and the covering has an index of refraction which substantially matches an index of refraction of the lens.

20. The optical display system of claim 19, wherein the optical combiner is configured to collimate light reflected toward the observer to create a reflected image with a focal point at or near optical infinity.

* * * * *